United States Patent
McAnally et al.

(10) Patent No.: US 6,580,604 B1
(45) Date of Patent: Jun. 17, 2003

(54) PERIPHERAL DEVICE BAY WITH ADAPTER PLATES

(75) Inventors: Andrew L. McAnally, Georgetown, TX (US); Steven L. Sands, Austin, TX (US); Blake West, Austin, TX (US); R. Steven Mills, Austin, TX (US)

(73) Assignee: Dell U.S.A., L.P., Round Rock, TX (US)

( * ) Notice: Subject to any disclaimer, the term of this patent is extended or adjusted under 35 U.S.C. 154(b) by 691 days.

(21) Appl. No.: 08/997,713

(22) Filed: Dec. 23, 1997

(51) Int. Cl.[7] ................................................. G06F 1/16
(52) U.S. Cl. .................. 361/685; 360/97.03; 321/223.1
(58) Field of Search ............................... 361/685, 724, 361/727, 683; 364/708.1; 360/97.03; 312/223.1

(56) References Cited

U.S. PATENT DOCUMENTS

| | | | | |
|---|---|---|---|---|
| 5,067,041 A | * | 11/1991 | Cooke et al. ................ | 361/683 |
| 5,332,306 A | | 7/1994 | Babb et al. ............. | 312/334.16 |
| 5,340,340 A | | 8/1994 | Hastings et al. .............. | 439/64 |
| 5,454,080 A | | 9/1995 | Fasig et al. .................. | 395/283 |
| 5,579,204 A | | 11/1996 | Nelson et al. .............. | 361/685 |
| 5,588,728 A | * | 12/1996 | Eldridge et al. ......... | 312/223.1 |
| 5,673,171 A | | 9/1997 | Varghese et al. ............ | 361/685 |
| 5,673,172 A | | 9/1997 | Hastings et al. ............ | 361/685 |
| 5,684,671 A | * | 11/1997 | Hobbs et al. ............... | 361/683 |
| 5,768,097 A | * | 6/1998 | Jelinger ...................... | 361/683 |
| 5,828,547 A | * | 10/1998 | Francovich et al. ........ | 361/685 |
| 5,865,518 A | * | 2/1999 | Jarrett et al. ............. | 312/223.1 |

* cited by examiner

Primary Examiner—Darren Schuberg
Assistant Examiner—Lisa Lea-Edmonds
(74) Attorney, Agent, or Firm—Haynes and Boone, LLP

(57) ABSTRACT

A single peripheral device bay including a frame can receive a variety of different adapter plates, and thereby accommodate the maximum number of devices for each of a variety of different types and/or sizes of peripheral devices when the adapter plates are chosen for the particular type and/or size of device. Such a peripheral device bay includes a frame that can be permanently attached to the chassis of a computer system or an external enclosure. The removable adapter plates are attached to the frame so as to accommodate different devices. Because the peripheral device bay can be permanently attached to the chassis or enclosure, it can provide either with additional structural stability.

29 Claims, 7 Drawing Sheets

PERIPHERAL DEVICE BAY WITH ADAPTER PLATES

BACKGROUND OF THE INVENTION

1. Field of the Invention

This invention relates to computer equipment enclosures, and more particularly to a peripheral device bay with adapter plates for mounting peripheral devices.

2. Description of the Related Art

Many computer systems, including personal computers, workstations, servers, and embedded systems are designed to have multiple peripheral devices included in the system. A typical personal computer system includes a processor, associated memory and control logic and a number of peripheral devices that provide input and output (I/O) for the system. Such peripheral devices include, for example, compact disk read-only memory (CD-ROM) drives, hard disk drives, floppy disk drives, and other mass storage devices such as tape drives, compact disk recordable (CD-R) drives or digital video/versatile disk (DVD) drives. Additionally, computer systems often have the capability to interface with external enclosures that include additional peripheral devices.

In many computer systems, it is desirable to include the maximum number of peripheral devices, e.g., hard drives, that can be enclosed in the chassis of the computer system. Similarly, if an external enclosure is used for hard drives, it is also desirable to design the enclosure to optimize space for the hard drives. One type of computer system where it is particularly desirable to optimize hard drive space is the network server. A network server is a focal point for processing and storage in a network, as the network server is responsible for distribution of application programs and data to client computer systems. Because of resource demands, network servers typically have several hard disk drives contained in a peripheral bay and providing nonvolatile storage for the application programs and data.

Additionally, multiple disk drives can be configured to cooperate advantageously using technology generally known as redundant array of inexpensive disks (RAID). RAID systems are particularly useful in the environment of network servers because they provide data redundancy, such that if a single disk drive fails, the data stored thereon can be reconstructed from the data stored on the remaining disks. In the most sophisticated network servers and RAID systems, a failed disk drive can be replaced and the data thereon restored by software without interrupting the server's operation. In so-called "hot plugging," the failed disk drive is removed and a new one installed in its place without cutting off the power to the drive or server, and without rebooting the server. A disk drive with this capability is often referred to as "hot-pluggable." One consequence of using hot-pluggable hard drives is that additional mounting hardware is required in a peripheral bay so that individual drives may be easily inserted and removed.

While designers of peripheral bays, computer system chassis, and external peripheral enclosures often seek to accommodate as many of a particular type of device as possible, they also desire the flexibility of accommodating a variety of different types of devices. For example, hard drives come in a variety of heights including 1 inch and 1.6 inches. A designer of a peripheral bay might choose to include mounting features so that a maximum number of 1 inch hard drives can be accommodated, for example five 1 inch hard drives. However, if that same drive bay is used for 1.6 inch hard drives, no more than two such drives can be accommodated using the same mounting features, thereby wasting space and failing to optimize the drive bay.

One solution is to include different mounting features for different types of drives. However, it is difficult to include such a variety of mounting features in a single drive bay because of limited space. This is particularly true for hot-pluggable drives that require additional mounting and interface hardware to facilitate insertion and removal.

Another solution is to have different peripheral bays for different sizes of hard drives. Thus, there would be one peripheral bay optimized for the maximum number of 1 inch hard drives, and a second peripheral bay optimized for 1.6 inch drive bays. The manufacturer of the computer system must be able to install different bays depending on a customer's drive selection. Additionally, a user who desires to switch from one drive size to another must remove a currently installed peripheral bay, and install a new peripheral bay. Either circumstance leads to additional assembly/modification effort, multiple different peripheral bay parts, and a weaker chassis structure because the peripheral bay must be removable instead of permanently installed in the chassis.

Accordingly, it is desirable to have a peripheral device bay for a computer system chassis or external enclosure that will accommodate the maximum number of devices for each of a variety of different types and/or sizes of peripheral devices.

SUMMARY OF THE INVENTION

It has been discovered that a single peripheral device bay that can receive a variety of different adapter plates, can accommodate the maximum number of devices for each of a variety of different types and/or sizes of peripheral devices when the adapter plates are chosen for the particular type and/or size of device. Such a peripheral device bay includes a frame that can be permanently attached to the chassis of a computer system or an external enclosure. The removable adapter plates are attached to the frame so as to accommodate different devices. Because the peripheral device bay need not be removable, it can be permanently attached to the chassis or enclosure, thereby providing either with additional structural stability. Additionally, because only the adapter plates need to be changed, and not the entire bay, manufacturing and subsequent modification are simplified. The manufacturer can wait until after an order is placed to configure the peripheral device bay. Moreover, users who desire to change the type kind of the peripheral device in the bay merely have to replace the adapter plates.

Accordingly, one aspect of the present invention provides a peripheral device bay that includes a frame and an adapter plate. The frame is sized to extend around a plurality of peripheral devices and includes a plurality of adapter plate mounting features. The adapter plate is removably attached to the frame. The adapter plate also includes a plurality of peripheral device mounting features located on the adapter plate and allowing a plurality of peripheral devices to be disposed thereon.

In another aspect of the invention, a computer system includes a processor, a memory coupled to the processor, a chassis supporting the processor and memory, and a peripheral device bay coupled to the chassis. The peripheral device bay includes a frame and an adapter plate. The frame is sized to extend around a plurality of peripheral devices and includes a plurality of adapter plate mounting features. The adapter plate is removably attached to the frame. The adapter plate also includes a plurality of peripheral device mounting features located on the adapter plate and allowing a plurality of peripheral devices to be disposed thereon.

In still another aspect of the invention, a method of optimizing peripheral device bay space is disclosed. A peripheral device bay is provided, including a frame sized to extend around a plurality of peripheral devices and including a plurality of adapter plate mounting features. An adapter plate is installed into the peripheral device bay, the adapter plate including a plurality of peripheral device mounting features located on the adapter plate and allowing a plurality of peripheral devices to be disposed thereon. The adapter plate is selected to have the plurality of peripheral device mounting features arranged so that a maximum number of peripheral devices of a single kind are capable of being mounted in the peripheral device bay.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
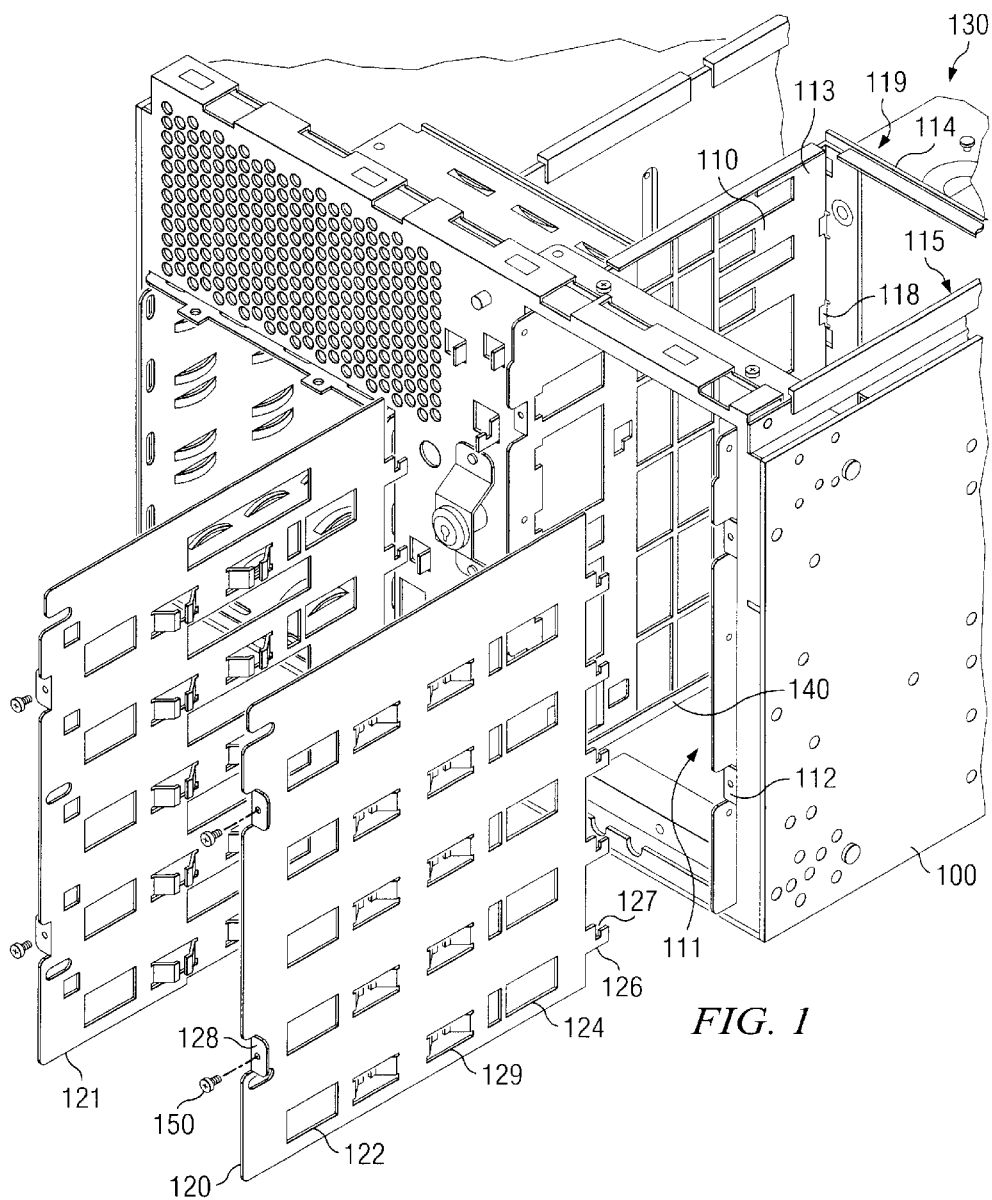
FIG. 1 is a perspective view of a computer system chassis with the frame of a peripheral device bay installed and showing adapter plates for a first kind of peripheral device prior to installation.

FIG. 1 shows a computer system chassis 100 with a peripheral device bay 130 that includes frame 110 and adapter plates 120 and 121 shown prior to installation into frame 110. Frame 110 has a front portion 111 and a rear portion 119. Frame 110 may be constructed of a single piece of a material, for example metal or plastic, or may be assembled from several pieces. As shown, frame 110 is a single piece of plate metal formed to have three sides 113, 114, and 115, each with various portions of the metal removed. In general, frame 110 may take any shape that can accommodate adapter plates 120 and 121 and that is sized to extend around a plurality of peripheral devices while still allowing the devices to be installed into and removed from the bay. Frame 110 is permanently attached to chassis 100 by rivets 140, welding, or the like. Alternatively, frame 110 may be removably attached to the chassis. Frame 110 is preferably located in the corner of chassis 100 so that when attached, the peripheral device bay 130 provides structural stability to the chassis. Frame 110 also includes adapter plate mounting features such as slots 118 and tabs 112 so that adapter plates 120 and 121 can be secured to the frame.

Adapter plate 120 includes a plurality of peripheral device mounting features such as apertures 122 and 124 that facilitate the mounting of peripheral devices to the adapter plates. Apertures 122 and 124 are arranged so that the maximum number of peripheral devices of a particular kind can be accommodated by adapter plate 120. Here, five rows of apertures 122 and 124 are included in adapter plate 120 so that five 1.6 inch hard drives and their associated hard drive trays (See FIG. 2) can be accommodated by peripheral device bay 130. Peripheral device mounting features included in adapter plate 120 need not be apertures like 122 and 124, and can instead be rails integrally formed with adapter plate 120, screw holes, slots, or any other feature suitable for mounting or facilitating the mounting of peripheral devices. Adapter plate 120 also includes mounting portions such as tabs 126 and 128. Tabs 126 are designed to be received by slots 118 in frame 110. Additionally, tabs 126 can include printed circuit board mounting features, for example hooks 127. Once inserted into the peripheral device bay, peripheral devices can interface with a printed circuit board (not shown) located along the rear portion 119 of frame 110. The printed circuit board is, in turn, coupled to a motherboard of the computer system. Because tabs 126 project through slots 118, hooks 127 can serve as mounting features for the printed circuit board that electronically couples all of the peripheral devices in bay 130 to the rest of the computer system. Additionally, frame 110 may include printed circuit board mounting features. Tabs 128 are fastened by screws 150 to corresponding tabs 112 in frame 110, further securing adapter plate 120 to frame 110. Although tabs 126 and 128 are shown as the mounting portions of adapter plate 120, a variety of different mounting portions can be used including clips, locks, and clamps.

Adapter plate 120 may also include additional features such as, for example projections 129. These projections from the adapter plate allow the electromagnetic interference (EMI) shield of a drive carrier (See FIG. 2) to conductively couple to the adapter plates and thereby to the rest of computer system chassis 100. Additionally, the locations of tabs 126 may be different depending upon the kind of device to be mounted to the adapter plate because the printed circuit board to which hooks 127 must attach may change depending on the kind of device. For example, an adapter plate for 1 inch hard drives may have one configuration of tabs 126 while an adapter plate for 1.6 inch hard drives may have a second configuration of tabs 126. Because 1 inch and 1.6 inch hard drives might require different printed circuit boards in order to interface with the computer system, different configurations of tabs 126 will ensure that only the correct printed circuit board (with slots corresponding to-the tab configuration for the appropriate adapter plate) is used with a particular adapter plate. Moreover, the location and orientation of adapter plate mounting portions, peripheral device mounting features, and other features ensure that adapter plate 120 can only be used in one orientation, thereby eliminating confusion during installation.

Adapter plate 121 includes features similar to those of adapter plate 120, all of which serve essentially the same functions as those of adapter plate 120. Adapter plates 120 and 121 are preferably constructed from metal plates, but may be formed from other suitable materials such as plastics.

Figure 2:
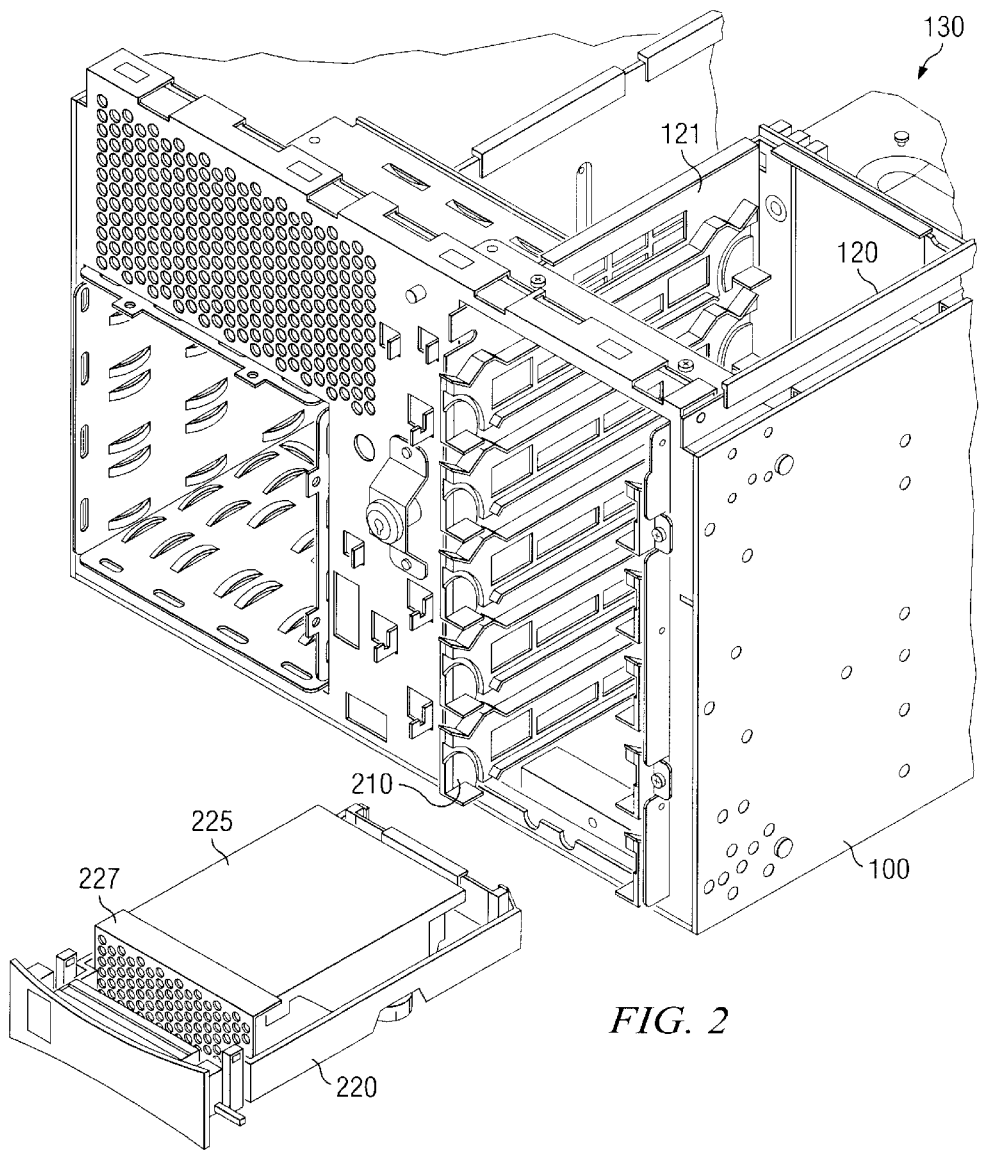
FIG. 2 is a perspective view of a computer system chassis including the peripheral device bay, associated peripheral device mounting features, and a first kind of peripheral device prior to insertion into the bay.

FIG. 2 shows computer chassis 100 with adapter plates 120 and 121 installed into frame 110. Additionally, adapter plates 120 and 121 include rails 210 attached to each pair of apertures 122 and 124 (See FIG. 1). Rails 210 include cantilevered attaching clips (not shown) for removably attaching the rails to the apertures 122 and 124. One example of such rails is found in U.S. patent application Ser. No. 08/963,788 entitled "Mounting Rail Retaining Pin Aperture," by Ty R. Schmitt, Arthur Lopez, and Steven L. Sands, filed Nov. 4, 1997, and incorporated herein by reference. Rails 210 allow drive carrier 220 to be inserted into, secured to, and removed from peripheral device bay 130. Drive carrier 220 includes a hard disk drive 225 (in this example a 1.6 inch high hard disk drive) and EMI shield 227. One example of such a drive carrier is found in U.S. Pat. No. 5,652,695 entitled "Hard Drive Carrier Design Permitting Floating Retention of a Connector Assembly to Facilitate Blind Mounting of the Computer Assembly" which is hereby incorporated by reference in its entirety. Drive carrier 220 is shown prior to insertion into peripheral device bay 130. Those of ordinary skill in the art will recognize that a variety of different devices like rails 210 can be used to facilitate the attachment of a peripheral device to device bay 130, and that a variety of different peripheral devices can be coupled to bay 130.

Figure 3:
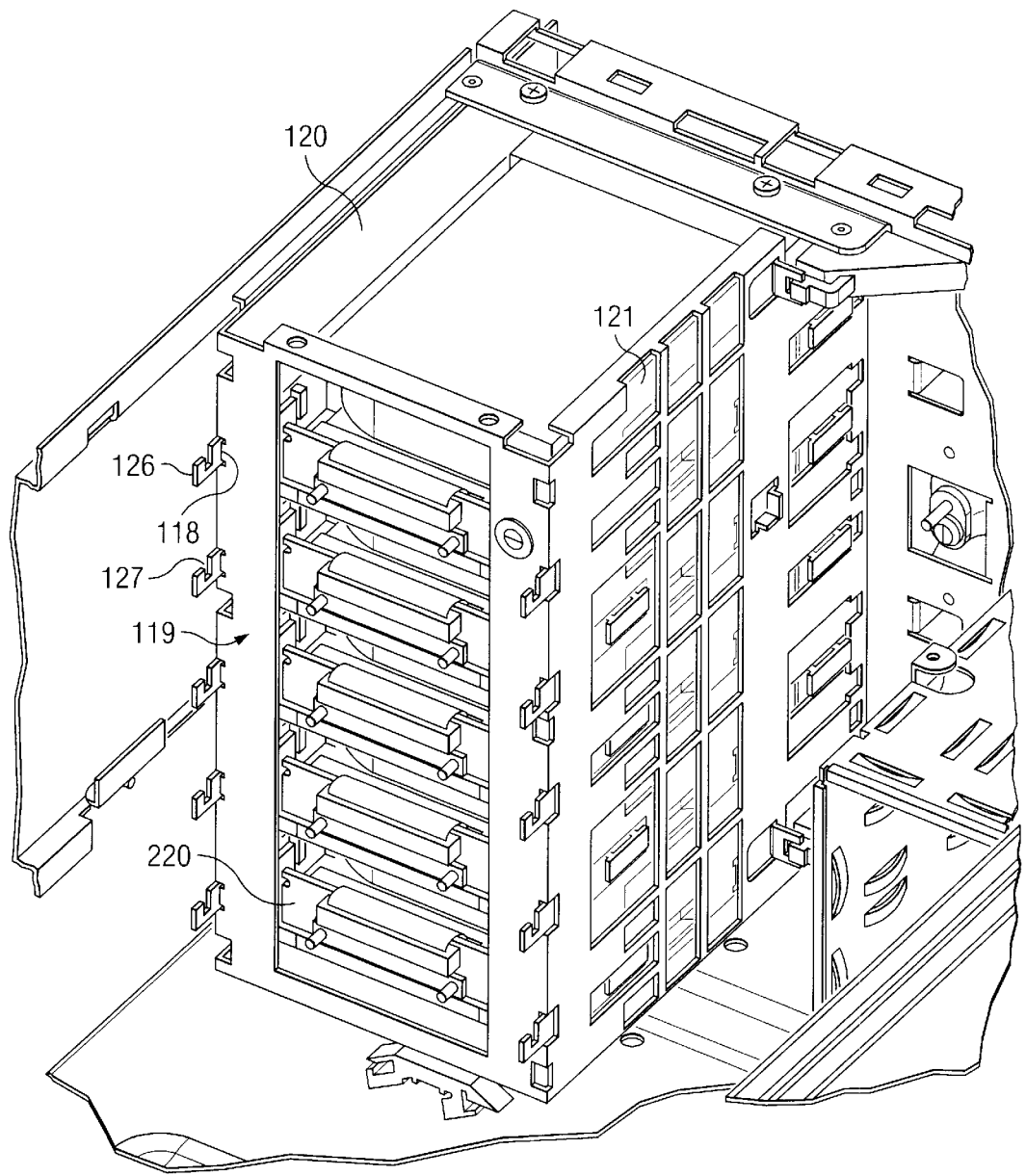
FIG. 3 is a rear perspective view of the peripheral device bay of FIG. 2 when the bay is filled with devices.

Referring to FIG. 3, the rear of device bay 130 is shown when the bay is filled with peripheral devices in device carriers 220. Tabs 126 of adapter plates 120 and 121 are shown protruding through slots 118 in the rear portion 119 of frame 110. While most of the tabs 126 on adapter plate 120 have a corresponding tab similarly located on adapter plate 121, the topmost tabs of the adapter plates are offset from each other. This is an example of the different tab configurations for the purpose of printed circuit board attachment as mentioned above.

Figure 4:
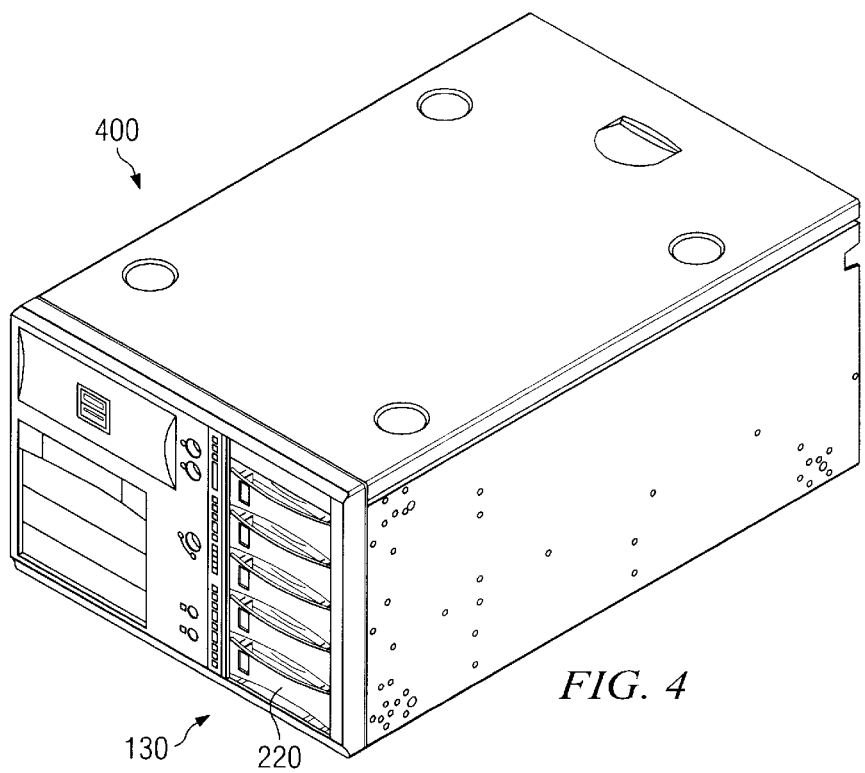
FIG. 4 is a perspective view of an assembled computer system including the first kind of peripheral devices.

FIG. 4 shows the assembled computer system 400 including five 1.6 inch hard disk drives installed in carriers 220, which are, in turn, installed into peripheral bay 130. Note that because of the adapter plates 120 and 121, the maximum number of 1.6 inch hard drives capable of being installed in thy given bay space are installed.

Figure 5:
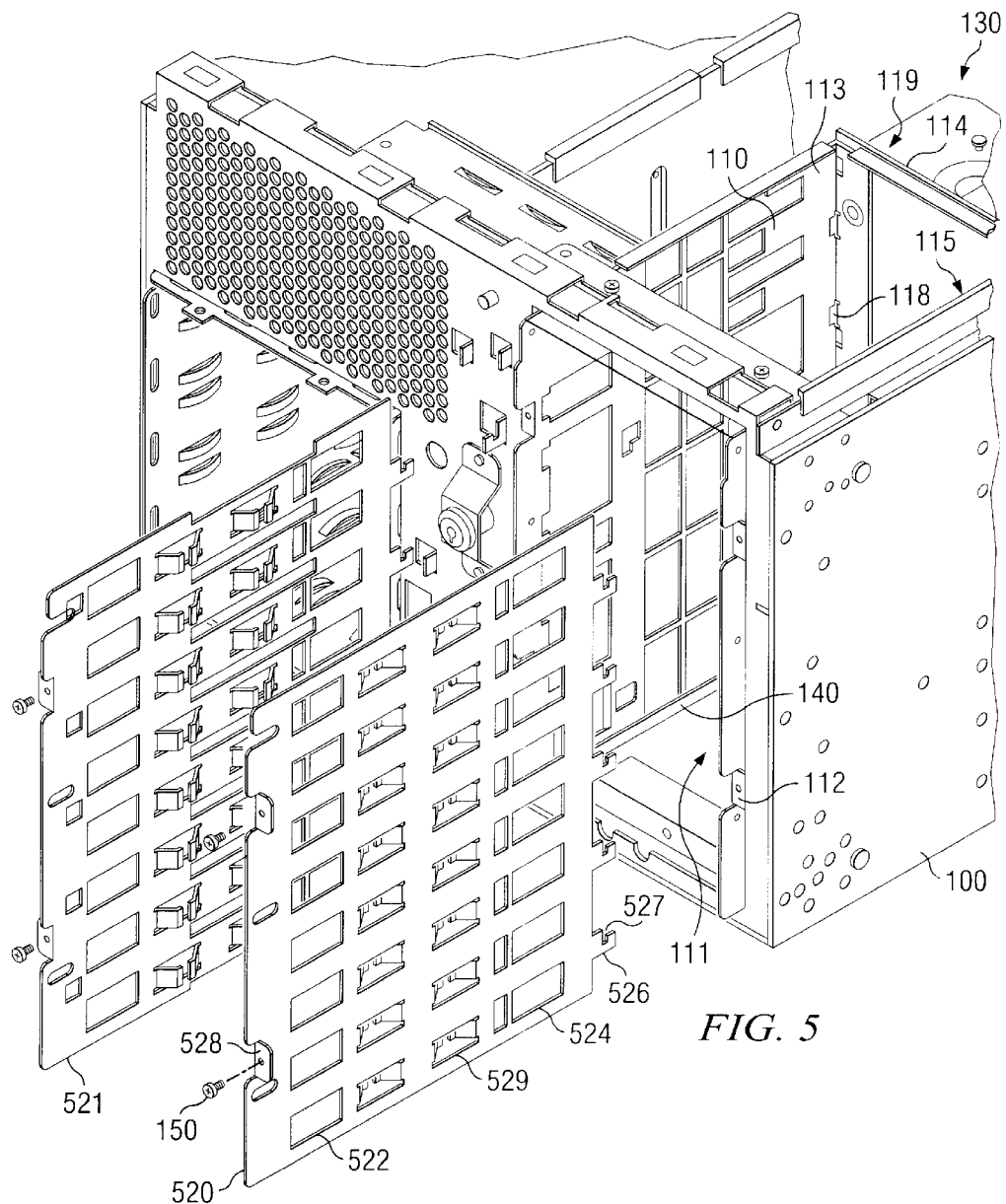
FIG. 5 is a perspective view of a computer system chassis with the frame of a peripheral device bay installed and showing adapter plates for a second kind of peripheral device prior to installation.

FIG. 5 shows a perspective of computer system chassis 100 with peripheral device bay 130 and including frame 110 and adapter plates 520 and 521 shown prior to installation into frame 110. Note that with the exception of adapter plates 520 and 521, FIG. 5 is identical to FIG. 1.

Adapter plate 520 includes a plurality of peripheral device mounting features such as apertures 522 and 524 that facilitate the mounting of peripheral devices to the adapter plates. Apertures 522 and 524 are arranged so that the maximum number of peripheral devices of a particular kind can be accommodated by the adapter plate 520. Here, eight rows of apertures 522 and 524 are included in adapter plate 520 so that eight 1 inch hard drives and their associated hard drive trays (See FIG. 6) can be accommodated by peripheral device bay 130. Peripheral device mounting features included in adapter plate 520 need not be apertures like 522 and 524, and can instead be rails integrally formed with adapter plate 520, screw holes, slots, or any other feature suitable for mounting or facilitating the mounting of peripheral devices. Adapter plate 520 also includes mounting portions such as tabs 526 and 528. In general, adapter plates 520 and 521 and their associated features function in a like manner as adapter plates 120 and 121, except that they allow the maximum number of a different kind of peripheral device to be mounted in peripheral device bay 130.

Figure 6:
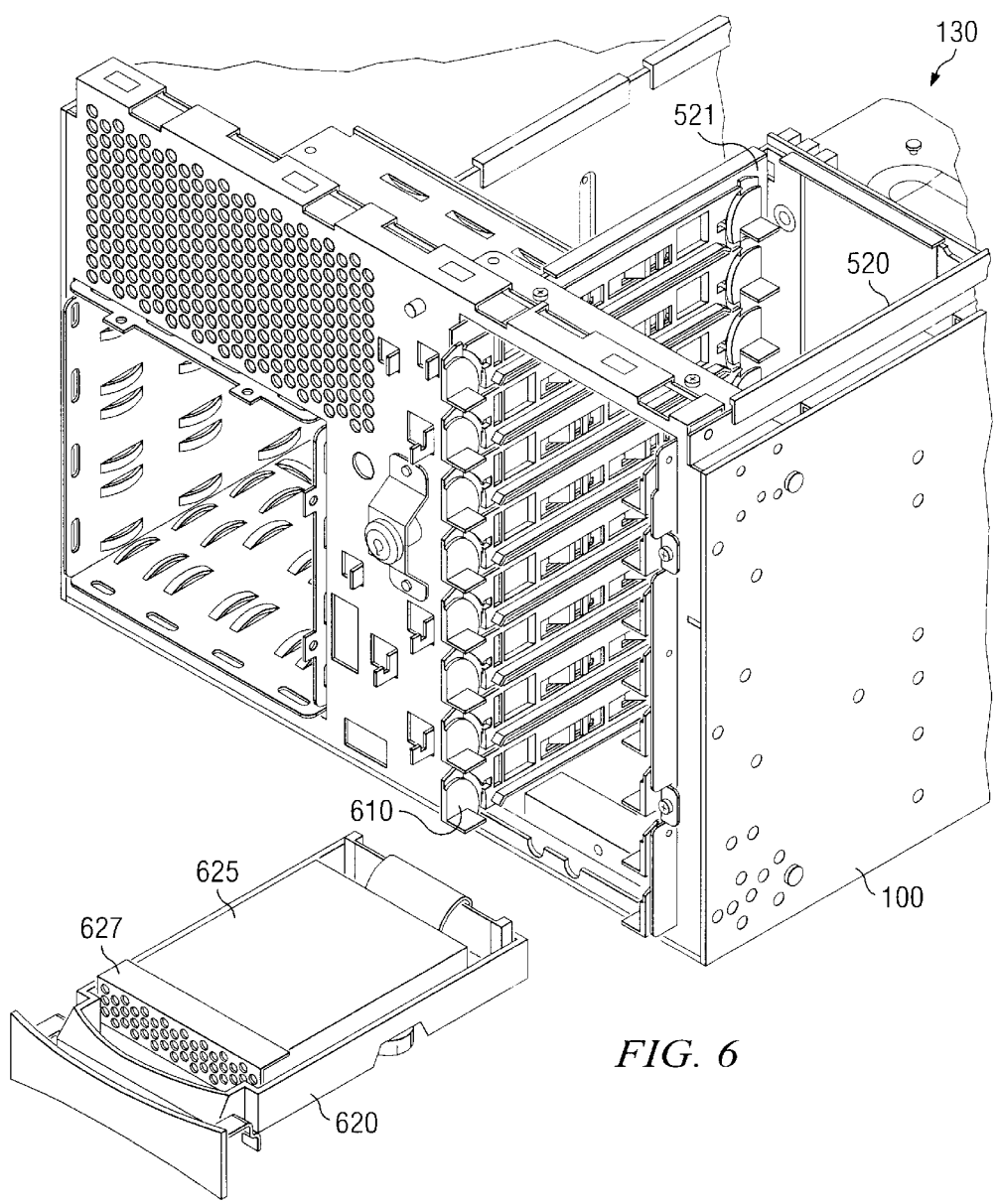
FIG. 6 is a perspective view of a computer system chassis including the peripheral device bay, associated peripheral device mounting features, and a second kind of peripheral device prior to insertion into the bay.

FIG. 6 shows computer chassis 100 with adapter plates 520 and 521 installed into frame 110. Additionally, adapter plates 520 and 521 include rails 610 attached to each pair of apertures 522 and 524 (See FIG. 5). Rails 610 allow drive carrier 620 to be inserted into, secured to, and removed from peripheral device bay 130. Drive carrier 620 includes a hard disk drive 625 (in this example a 1 inch high hard disk drive) and EMI shield 627. Drive carrier 620 is shown prior to insertion into peripheral device bay 130. Those of ordinary skill in the art will recognize that a variety of different devices like rails 610 can be used to facilitate the attachment of a peripheral device to device bay 130, and that a variety of different peripheral devices can be coupled to bay 130.

Figure 7:
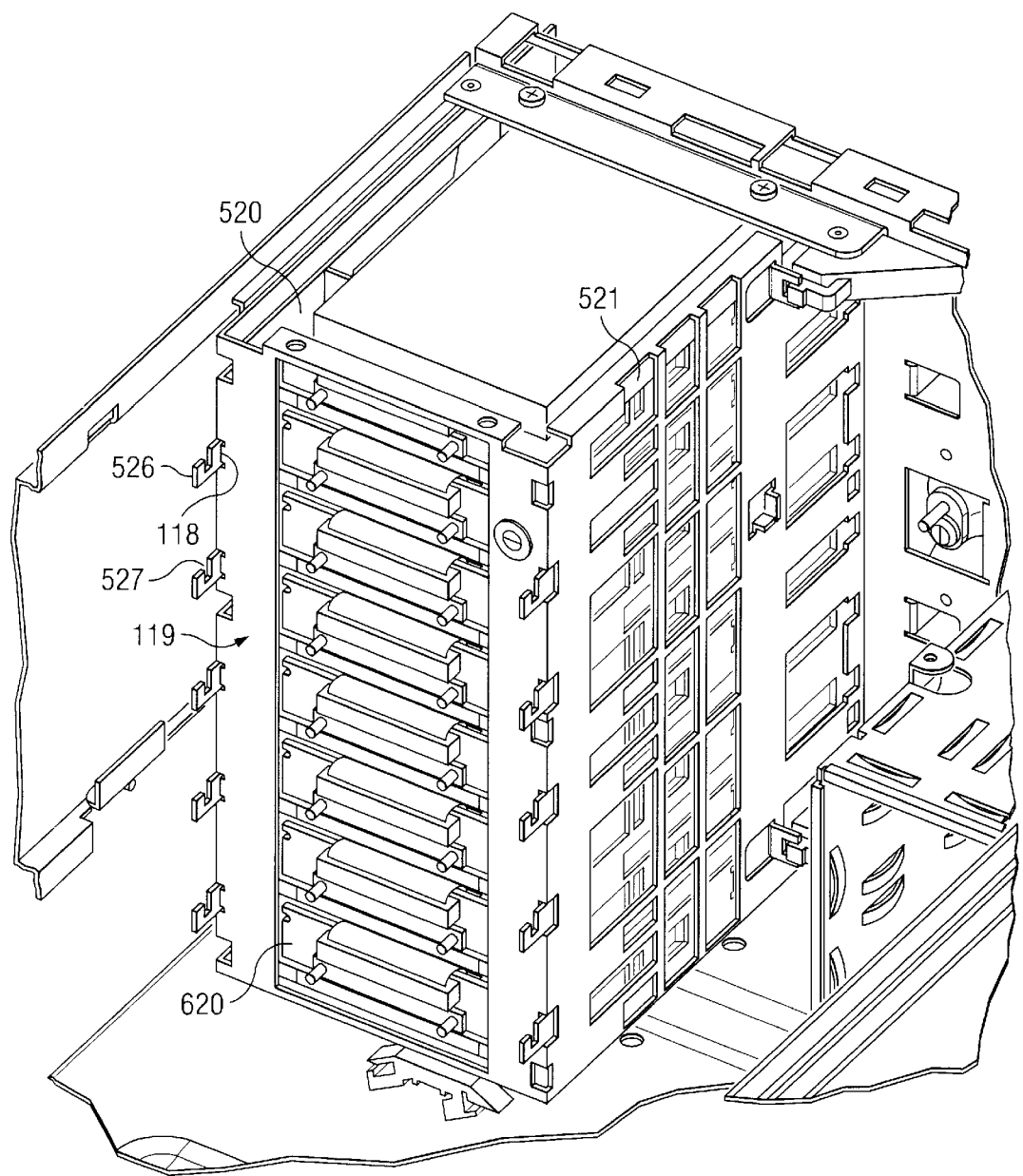
FIG. 7 is a rear perspective view of the peripheral device bay of FIG. 6 when the bay is filled with devices.

Referring to FIG. 7, the rear of device bay 130 is shown when the bay is filled with peripheral devices in device carriers 620. Tabs 526 of adapter plates 520 and 521 are shown protruding through slots 118 in the rear portion 119 of frame 110. In contrast to adapter plates 120 and 121 of FIG. 3, all of tabs 526 on adapter plate 520 have a corresponding tab similarly located on adapter plate 521. Because of the difference in layout between tabs 126 of adapter plate 120 and tabs 526 of adapter plate 520, the respective printed circuit boards associated with each kind of adapter plate cannot be installed with the incorrect kind of adapter plates. Thus, for example, a printed circuit board for eight 1 inch drives cannot be used with the adapter plates for five 1.6 inch drives.

Figure 8:
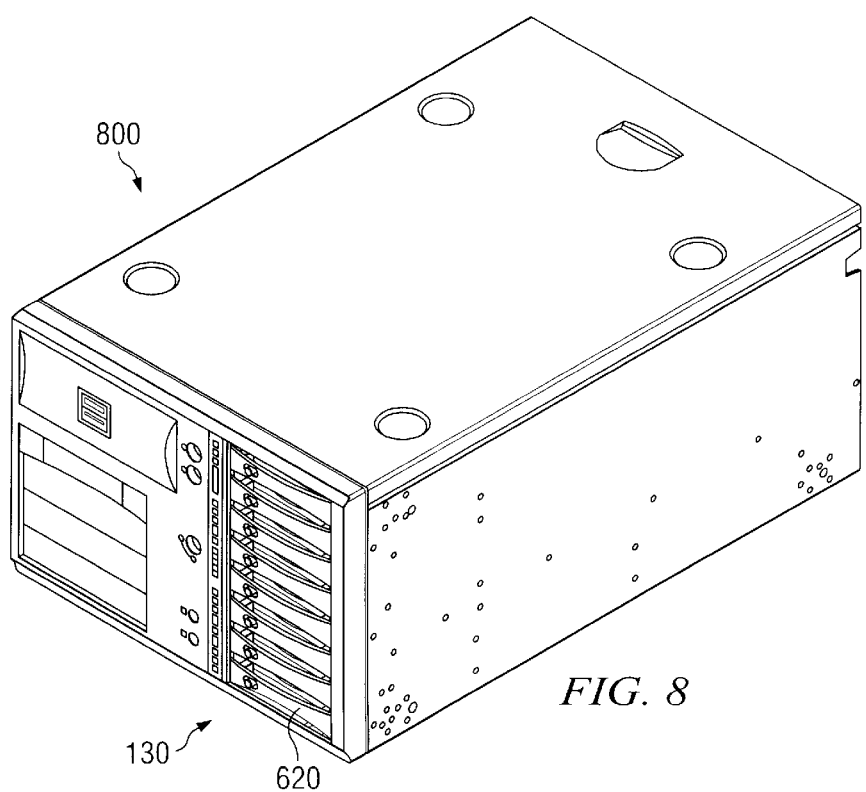
FIG. 8 is a perspective view of an assembled computer system including the second kind of peripheral devices.

FIG. 8 shows the assembled computer system 800 including eight 1 inch hard disk drives installed in carriers 620, which are, in turn, installed into peripheral bay 130. Note that because of the adapter plates 520 and 521, the maximum number of 1 inch hard drives capable of being installed in the given bay space are installed.

Although the examples shown in FIGS. 1–8 illustrate peripheral devices that are hard disk drives, it will be apparent to those of ordinary skill in the art that a variety of different peripheral devices can take advantage of the device bay and adapter plates disclosed in this application. Additionally, other devices associated with computer system operation, for example removable power supplies, may also use the device bay and adapter described herein. Moreover, a single pair of adapter plates can be designed to accommodate more than one type of device or more.than one size of a particular type of device.

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A peripheral device bay comprising:
   a frame sized to extend around a plurality of peripheral devices and including a plurality of adapter plate mounting features; and
   an adapter plate removably attached to the frame, the adapter plate including a plurality of peripheral device mounting features located on the adapter plate and allowing a plurality of peripheral devices to be disposed thereon.

2. The peripheral device bay of claim 1 wherein the plurality of peripheral device mounting features are arranged so that a maximum number of peripheral devices of a single kind are capable of being mounted in the peripheral device bay.

3. The peripheral device bay of claim 2 wherein the single kind of peripheral device is selected from a first size peripheral device and a second size peripheral device.

4. The peripheral device bay of claim 1 wherein the plurality of peripheral device mounting features includes a plurality of apertures.

5. The peripheral device bay of claim 4 wherein the plurality apertures are capable of receiving a plurality of removably attachable rails, the rails for receiving peripheral devices.

6. The peripheral device bay of claim 1 wherein the plurality of peripheral device mounting features includes a plurality of rails integrally formed from the adapter plate, the rails for receiving peripheral devices.

7. The peripheral device bay of claim 1 wherein at least one of the frame and the adapter plate include a printed circuit board mounting feature.

8. The peripheral device bay of claim 1 wherein the frame includes a front portion and a rear portion, wherein at least one of the plurality of adapter plate mounting features is located on the front portion of the frame, and wherein the adapter plate includes a mounting portion located to correspond to the at least one of the plurality of adapter plate mounting features thereby allowing the adapter plate to attach to the frame.

9. The peripheral device bay of claim 1 wherein the frame includes a front portion and a rear portion, wherein at least one of the plurality of adapter plate mounting features is located on the rear portion of the frame, and wherein the adapter plate includes a mounting portion located to correspond to the at least one of the plurality of adapter plate mounting features thereby allowing the adapter plate to attach to the frame.

10. The peripheral device bay of claim 9 wherein the at least one of the plurality of adapter plate mounting features is a slot and wherein the mounting portion is a tab sized to be received by the slot.

11. The peripheral device bay of claim 10 wherein the tab includes a printed circuit board mounting feature.

12. The peripheral device bay of claim 11 wherein the tab is located on the adapter plate so that a printed circuit board can only be coupled to the printed circuit board mounting feature in a first orientation.

13. The peripheral device bay of claim 11 wherein the tab is located on the adapter plate so that only a first kind of printed circuit board can be coupled to the printed circuit board mounting feature.

14. A computer system comprising:
  a processor;
  a memory coupled to the processor;
  a chassis supporting the processor and the memory; and
  a peripheral device bay coupled to the chassis, the peripheral device bay including:
    a frame sized to extend around a plurality of peripheral devices and including a plurality of adapter plate mounting features; and
    an adapter plate removably attached to the frame, the adapter plate including a plurality of peripheral device mounting features located on the adapter plate and allowing a plurality of a first size peripheral device to be disposed thereon.

15. The computer system of claim 14 including a peripheral device coupled to the adapter plate through at least one of the plurality of peripheral device mounting features.

16. The computer system of claim 15 wherein the peripheral device is a hard drive.

17. The computer system of claim 14 wherein the plurality of peripheral device mounting features are arranged so that a maximum number of peripheral devices of a single kind are capable of being mounted in the peripheral device bay.

18. The computer system of claim 17 wherein the single kind of peripheral device is selected from a first size peripheral device and a second size peripheral device.

19. The computer system of claim 14 wherein the plurality of peripheral device mounting features includes a plurality of apertures, the plurality apertures being capable of receiving a plurality of removably attachable rails, the rails for receiving peripheral devices.

20. The computer system of claim 14 wherein the plurality of peripheral device mounting features includes a plurality of rails integrally formed from the adapter plate, the rails for receiving peripheral devices.

21. The computer system of claim 14 wherein the frame includes a front portion and a rear portion, wherein at least one of the plurality of adapter plate mounting features is located on the front portion of the frame, and wherein the adapter plate includes a mounting portion located to correspond to the at least one of the plurality of adapter plate mounting features thereby allowing the adapter plate to attach to the frame.

22. The computer system of claim 14 wherein the frame includes a front portion and a rear portion, wherein at least one of the plurality of adapter plate mounting features is located on the rear portion of the frame, and wherein the adapter plate includes a mounting portion located to correspond to the at least one of the plurality of adapter plate mounting features thereby allowing the adapter plate to attach to the frame.

23. The computer system of claim 22 wherein the at least one of the plurality of adapter plate mounting features is a slot and wherein the mounting portion is a tab sized to be received by the slot.

24. The computer system of claim 23 wherein the tab includes a printed circuit board mounting feature.

25. The computer system of claim 24 wherein the tab is located on the adapter plate so that a printed circuit board can only be coupled to the printed circuit board mounting feature in a first orientation.

26. The computer system of claim 24 wherein the tab is located on the adapter plate so that only a first kind of printed circuit board can be coupled to the printed circuit board mounting feature.

27. The computer system of claim 14 wherein the peripheral bay is coupled to the chassis so as to provide structural support to the chassis.

28. The computer system of claim 14 wherein the peripheral bay is coupled to the chassis using rivets.

29. A method of optimizing peripheral device bay space comprising:
  providing a peripheral device bay including a frame sized to extend around a plurality of peripheral devices and including a plurality of adapter plate mounting features; and
  installing an adapter plate into the peripheral device bay, the adapter plate including a plurality of peripheral device mounting features located on the adapter plate and allowing a plurality of peripheral devices to be disposed thereon, the adapter plate being selected to have the plurality of peripheral device mounting features arranged so that a maximum number of peripheral devices of a single kind are capable of being mounted in the peripheral device bay.

* * * * *